US012746493B2

(12) United States Patent
Kim et al.

(10) Patent No.: US 12,746,493 B2
(45) Date of Patent: Sep. 29, 2026

(54) FILTER UNIT

(71) Applicant: Samsung Biologics Co., Ltd., Incheon (KR)

(72) Inventors: Joo Soung Kim, Gyeonggi-do (KR); Ja Hyun Goo, Gyeonggi-do (KR)

(73) Assignee: Samsung Biologics Co., Ltd., Incheon (KR)

( * ) Notice: Subject to any disclaimer, the term of this patent is extended or adjusted under 35 U.S.C. 154(b) by 656 days.

(21) Appl. No.: 18/037,728

(22) PCT Filed: Jan. 21, 2022

(86) PCT No.: PCT/IB2022/050499
§ 371 (c)(1),
(2) Date: Nov. 9, 2023

(87) PCT Pub. No.: WO2022/107115
PCT Pub. Date: May 27, 2022

(65) Prior Publication Data

US 2024/0115982 A1 Apr. 11, 2024

(30) Foreign Application Priority Data

Nov. 23, 2020 (KR) ........................ 10-2020-0157667

(51) Int. Cl.

| | |
|---|---|
| ***F24F 13/28*** | (2006.01) |
| ***B01D 46/00*** | (2022.01) |
| ***F24F 3/167*** | (2021.01) |
| ***F24F 11/39*** | (2018.01) |
| *B01D 46/62* | (2022.01) |

(Continued)

(52) U.S. Cl.
CPC .......... *B01D 46/0005* (2013.01); *F24F 13/28* (2013.01); *B01D 46/645* (2022.01); *B01D 46/88* (2022.01); *B01D 2273/18* (2013.01); *B01D 2279/51* (2013.01); *F24F 3/167* (2021.01); *F24F 11/39* (2018.01); *G01N 2015/084* (2013.01)

(58) Field of Classification Search
None
See application file for complete search history.

(56) References Cited

U.S. PATENT DOCUMENTS 4,371,386 A 2/1983 De Vecchi
4,801,316 A 1/1989 Schroeder
(Continued)

FOREIGN PATENT DOCUMENTS

JP 2000-288328 A 10/2000
KR 200301988 Y1 * 1/2003 ............ B01D 46/00
(Continued)

OTHER PUBLICATIONS

KR20180053821A_Eng (Espacenet machine translation of Sim) (Year: 2018).*

(Continued)

*Primary Examiner* — Gabriel E Gitman
(74) *Attorney, Agent, or Firm* — Foley & Lardner LLP

(57) ABSTRACT

Provided is a filter unit, including a frame fixed along a perimeter of an opening in a wall, a housing connected to the frame to form an inner space, a cover plate installed on the frame to cover the inner space, and a filter box provided with a filter and installed in the inner space.

12 Claims, 7 Drawing Sheets

(51) Int. Cl.

| | |
|---|---|
| *B01D 46/88* | (2022.01) |
| *G01N 15/08* | (2006.01) |

(56) References Cited

U.S. PATENT DOCUMENTS

| | | | |
|---|---|---|---|
| 5,100,445 | A | 3/1992 | Johnson et al. |
| 10,345,215 | B1 | 7/2019 | Pedalino et al. |
| 10,976,212 | B2 | 4/2021 | Kawasaki |
| 2006/0042359 | A1 | 3/2006 | Morse et al. |
| 2018/0147518 | A1 | 5/2018 | Addington |
| 2019/0368995 | A1 | 12/2019 | Pedalino et al. |

FOREIGN PATENT DOCUMENTS

| | | | | | |
|---|---|---|---|---|---|
| KR | 20-0343302 | Y1 | | 2/2004 | |
| KR | 200380021 | Y1 | * | 3/2005 | ......... B01D 46/0005 |
| KR | 20060084567 | A | * | 7/2006 | ............... H04B 7/24 |
| KR | 10-0664720 | B1 | | 1/2007 | |
| KR | 10-2011-0111120 | A | | 10/2011 | |
| KR | 20110111120 | A | * | 10/2011 | ................ F24F 7/04 |
| KR | 10-2015-0095491 | A | | 8/2015 | |
| KR | 20180053821 | A | * | 5/2018 | ............. F24F 13/20 |
| KR | 10-2019-0083644 | A | | 7/2019 | |
| KR | 10-1260943 | B1 | | 6/2020 | |
| KR | 10-2120148 | B1 | | 6/2020 | |
| WO | WO-2005/065803 | A1 | | 7/2005 | |

OTHER PUBLICATIONS

KR200301988Y1_Eng (Espacenet machine translation of Choi) (Year: 2003).*

KR200380021Y1_Eng (Espacenet machine translation of Moon) (Year: 2005).*

KR20060084567A_Eng (Espacenet machine translation of Park) (Year: 2006).*

KR20110111120A_Eng (Espacenet machine translation of Joo) (Year: 2011).*

* cited by examiner

FILTER UNIT

TECHNICAL FIELD

This disclosure relates to a filter unit. More specifically, the present disclosure relates to a filter unit that is installed in an opening in a wall such as a ceiling.

BACKGROUND ART

In manufacturing of pharmaceuticals, or in the manufacturing of semiconductors or electronic parts, operations are performed in an environment in which the inside is maintained in a dust-free and aseptic state so that contaminants from the external environment do not flow into the inside. In general, a space with such an environment is called a clean room.

A filter unit equipped with a filter, for example, a HEPA filter, for filtering and purifying impurities such as dust from flew air from the outside is installed on a wall such as a ceiling inside the clean room. Through the filter unit, impurities such as dust and particulates can be prevented from being attached to the product being manufactured, and thus product defects may be minimized.

In general, a housing in which the filter box containing the filter is installed is installed in the opening of the wall (ceiling), and the filter unit consists of perforated cover plate mounted on the opening of the housing.

Conventionally, when replacing a filter, operations can be performed after the perforated cover plate is removed, and thus it takes a lot of time to remove the cover plate and there is a high risk of safety accident.

Meanwhile, regarding the inside of the clean room, cleanness that satisfies the standards required for pharmaceutical manufacturing must be guaranteed. In order to maintain the cleanness, filter leak test (PAO test) is regularly conducted to check performance of filters installed in the clean room.

For a filter leak test, equipment to inject solution-containing aerosol into a filter unit and equipment to detect particulates inside the filter unit must be installed on the filter unit, and thus preparation for testing is cumbersome and time-consuming. Further, there is also the inconvenience of having to remove a cover plate when installing the test equipment.

DISCLOSURE OF INVENTION

Technical Goals

An aspect provides a filter unit for easy replacement or maintenance of filter box. Further, an aspect provides a filter unit for easy filter leak test.

Technical Solutions

According to an aspect, there is provided a filter unit, including a frame fixed along a perimeter of an opening in a wall, a housing connected to the frame to form an inner space, a cover plate installed on the frame to cover the inner space, and a filter box provided with a filter and installed in the inner space.

According to an example embodiment, the cover plate may be coupled to the frame by a hinge to open and close the inner space.

According to an example embodiment, the cover plate may be coupled to one side of the frame by the hinge, and is coupled to another side of the frame by a fastening member.

According to an example embodiment, the cover plate may have a plurality of holes for fluid communication.

According to an example embodiment, the frame may have an end that is fixed to an outer surface of the wall and extends inwardly of the opening and another end that is coupled to the filter box.

According to an example embodiment, the frame may include an outer fixing part that is fixed to the outer surface of the wall, an inner fixing part that is coupled with the filter box, and a connecting part that connects the outer fixing part and the inner fixing part, and is bent to form a height difference between the outer fixing part and the inner fixing part.

According to an example embodiment, the frame may have a first piping part communicating with an inside of the housing and a second piping part extending to an upper end of the filter box.

According to an example embodiment, the first piping part may include a first connector communicating with an outside and fixed to the frame, a first pipe connected to the first connector, extending to the inner space, and a nozzle provided to the first pipe.

According to an example embodiment, the second piping part may include a second connector communicating with the outside and fixed to the frame, and a second pipe connected to the second connector, extending to the upper end of the filter box and having an open end.

According to an example embodiment, the housing may be located inside the opening, and a separating space may be formed between the housing and the perimeter of the opening.

According to an example embodiment, the first piping part may include a first connector communicating with the outside and fixed to a side of the separating space of the frame, a first pipe that is connected to the first connector, penetrating the housing in the separating space, and extending to the inner space, and a nozzle provided in the inner space of the first pipe.

According to an example embodiment, the second piping part may include a second connector communicating with the outside and fixed to a side of the separating space of the frame, and a second pipe connected to the second connector, penetrating the housing in the separating space, and extending to the upper end of the filter box, wherein the end at the upper end of the filter box of the second pipe is open.

According to an example embodiment, the open end of the second pipe may have a height that is equal to or higher than a height of the upper end of the filter box.

Effects

According to example embodiments, as a cover plate of a filter unit is hinged, it is possible to safely and easily perform replacement and maintenance work of the filter box without removing the cover plate.

Further, by having a connector for connecting equipment for a filter leak test, it is possible to perform the filter leak test easily and quickly.

BEST MODE FOR CARRYING OUT THE INVENTION

Figure 1:
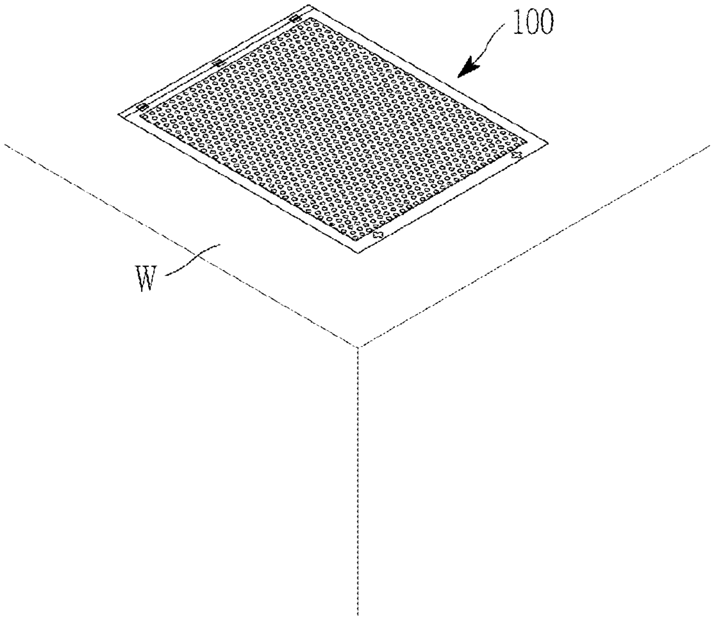
FIG. 1 is a view showing a state in which a filter unit according to an example embodiment is installed on a wall.

Hereinafter, with reference to the accompanying drawings, example embodiments will be described in detail so that those skilled in the art can easily carry out the present disclosure. The example embodiments may be implemented in many different forms, and the present disclosure is not limited to the example embodiments set forth therein.

In order to clearly explain the example embodiments in the drawings, parts irrelevant to the description are omitted, and in the entire of the present disclosure, the same reference numerals are attached to the same or similar elements.

Further, since the size and thickness of each element illustrated in the drawings are arbitrarily illustrated for convenience of description, the present disclosure is not necessarily limited to the drawings.

In the present disclosure, when a part is described as "being connected" to another part, the description not only includes the case of "direct connection" but also includes the case of "indirect connection" through another member, and when a part is described as "comprising or including" a component, it does not exclude another component but may further include another component unless otherwise stated.

FIG. 1 is a view showing a state in which a filter unit according to an example embodiment is installed on a wall.

Referring to FIG. 1, a filter unit 100 according to an example embodiment is installed on a wall. Here, the wall includes a side wall and a ceiling forming a space, and hereinafter, the ceiling is explained as an example. However, the "wall" is not limited to the ceiling. The wall may include all the walls and floors that form a space. For example, the filter unit 100 may be installed in the opening of the ceiling W of the clean room, and may be installed in a form of blocking the opening.

In the filter unit 100, a porous cover plate 110 (see FIG. 2) having a plurality of holes covers a filter with being exposed to the ceiling surface. A filter box containing a filter is installed at a position inside (upper than) the ceiling surface. In other words, at least a portion of the filter unit 100 may be installed in a form buried in the upper space of the ceiling W through the opening of the ceiling W.

According to an example embodiment, the porous cover plate exposed to the ceiling surface and covering the inner filter box may be opened and closed by a hinge. Via the hinge, it is possible not to remove the cover plate when replacing the filter or when installing equipment for a filter leak test.

Hereinafter, the specific configuration of the filter unit 100 according to example embodiments will be described in detail.

Figure 2:
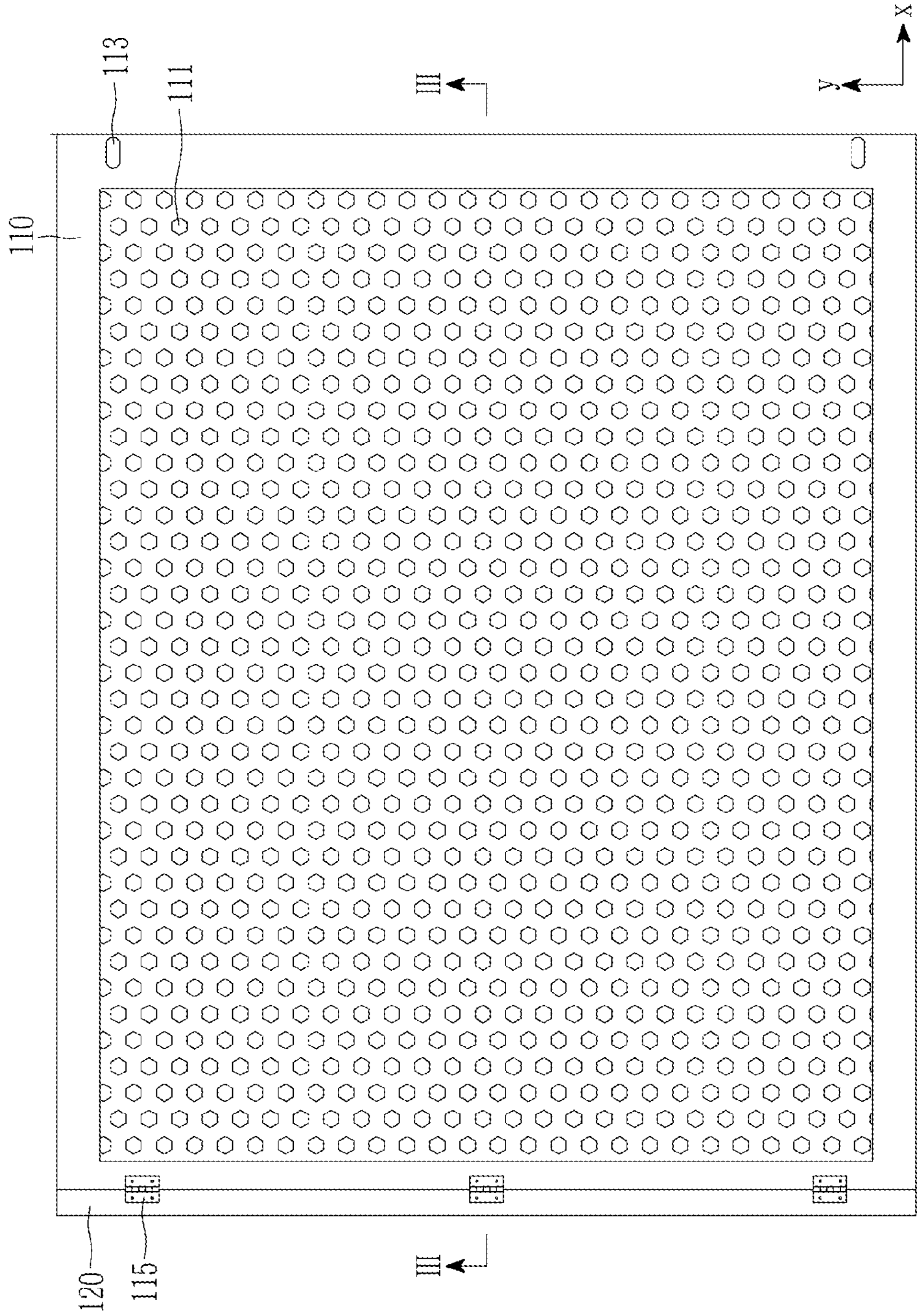
FIG. 2 is a bottom view of a filter unit according to an example embodiment.
Figure 3:
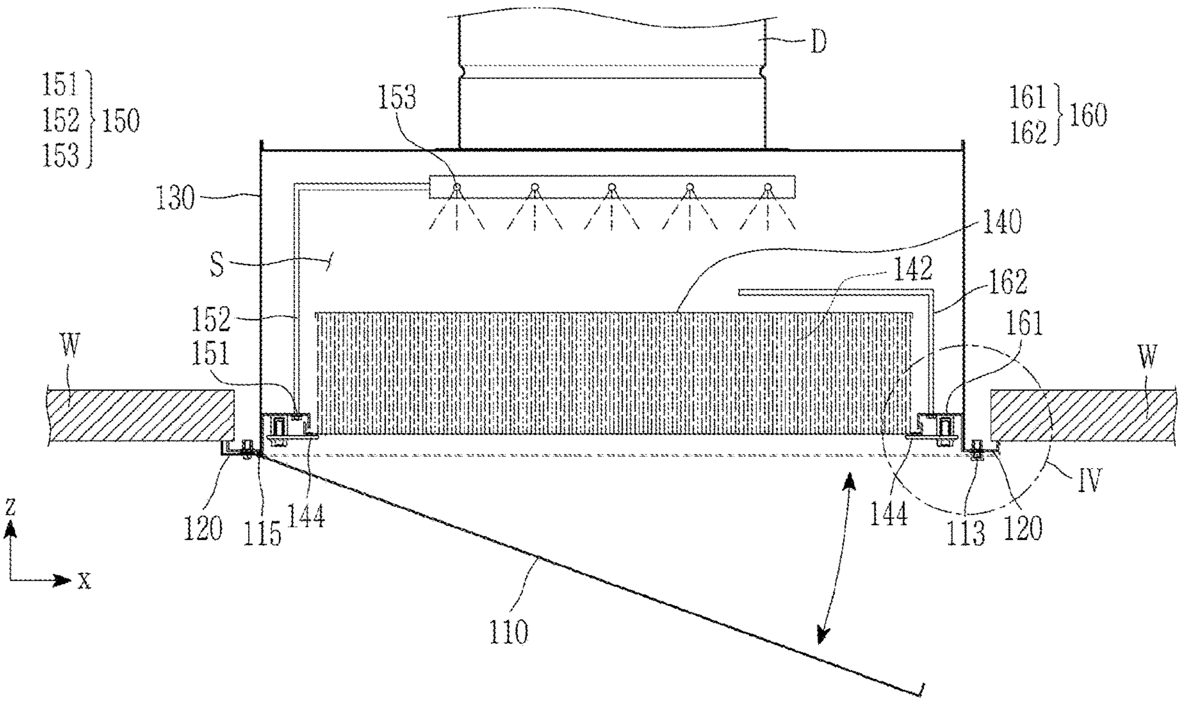
FIG. 3 is a cross-sectional view showing a cross section of III-III in FIG. 2.
Figure 4:
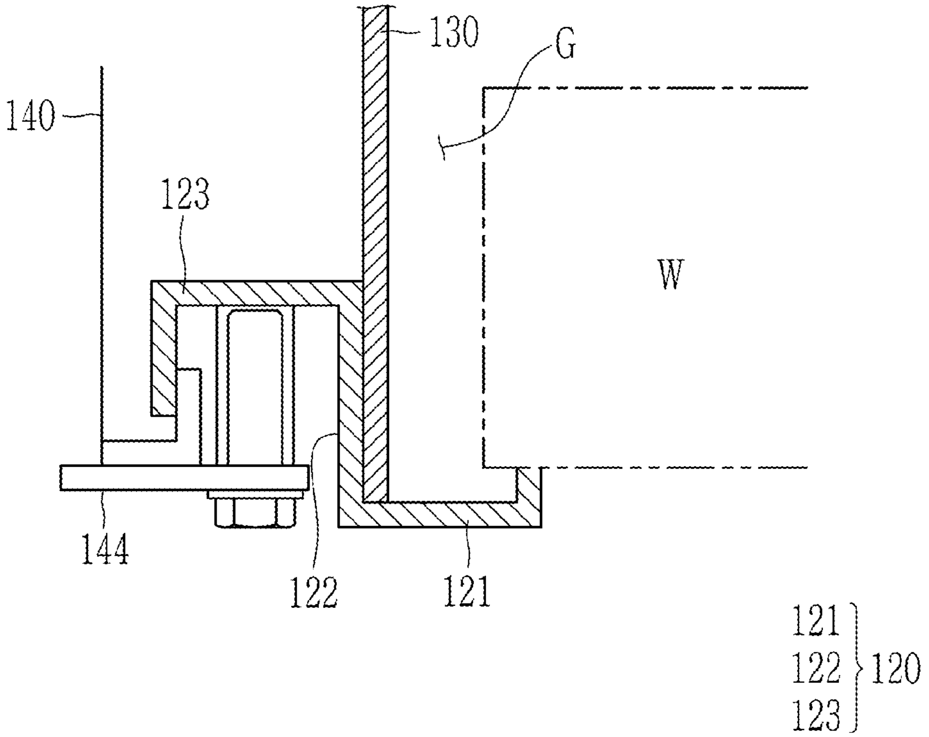
FIG. 4 is an enlarged view of part IV of FIG. 3.

FIG. 2 is a bottom view of a filter unit according to an example embodiment, FIG. 3 is a cross-sectional view showing a cross section of III-III in FIG. 2, and FIG. 4 is an enlarged view of part IV of FIG. 3.

Referring to FIGS. 2 to 4, the filter unit 100 according to the example embodiments includes a frame 120, a housing 130, the cover plate 110 and a filter box 140.

The frame 120 is a part constituting an edge of the filter unit 100, and the frame 120 may be fixed along the perimeter of the opening of the wall, for example, the ceiling W. According to an example embodiment, when a rectangular opening is formed in the ceiling W, in order to correspond to the shape of the opening, the frame 120 may be formed in a rectangular frame shape, and the frame 120 may support the housing 130 and the cover plate 110 to be described later.

The housing 130 is a part that becomes the body of the filter unit 100. The housing 130 may have a box shape forming the inner space S, for example, a rectangular parallelepiped shape, but it is not limited thereto. One surface corresponding to the ceiling surface of the housing 130, that is, the lower end may have an open shape.

The housing 130 is connected to and supported by the frame 120, and the filter box 140 to be described later is installed in the inner space S. The housing 130 may be connected to a duct D for supplying air so that external air can be supplied to the inner space S where the filter is located. Further, even though not illustrated, the housing 130 may be connected to a structure inside (upper part) of the ceiling W by an additional support member. Here, "inside of the ceiling W" indicates a space above the ceiling W, that is, a space in the Z-axis direction from the ceiling W based on FIG. 3.

The cover plate 110 is configured to cover one open surface of the housing 130. The cover plate 110 may be installed on the frame 120 and may be installed to open and close the inner space S.

According to an example embodiment, the cover plate 110 may be hinged to the frame 120. For example, one side of the cover plate 110 may be coupled to the frame 120 through a hinge 115, and another side of the cover plate 110 may be detachably coupled to the frame 120 through a fastening member 113. Here, the fastening member 113 may be composed of a T-bolt or the like that can be easily handled by the operator. A coupling part to which a fastening member can be coupled, for example, a through hole through which a T-bolt can pass may be formed at a position of the cover plate 110 corresponding thereto.

The cover plate 110 is disposed in the direction of the lower surface (based on FIG. 3) of the filter box 140, and a plurality of holes 111 may be formed in the cover plate 110 so that air may pass through the filter box 140. For example, the cover plate 110 may be a perforated plate by which fluid communication is possible.

Therefore, external air supplied through the duct D may be flew into the housing 130, foreign matters may be filtered through the filter box 140, and the external air from which foreign matters are filtered is supplied into a space (for example, a clean room) through the cover plate 110.

The filter box 140 has a filter 142 therein to filter foreign matters in the air, and the filter box 140 is installed in the inner space S of the housing 130. Here, since the filter box 140 is a consumable item that needs to be replaced, it can be detachably installed.

Referring to FIG. 4, the filter box 140 may be supported on the frame 120, and the filter box 140 may be coupled to the frame 120 through a plurality of brackets 144 connected to the filter box 140. The brackets 144 may be detachably coupled to the frame 120 through separate fastening parts.

As described above, since the housing 130, the cover plate 110 and the filter box 140 can all be supported by the frame 120, the detailed structure of the frame 120 will be described below.

One end of the frame 120 is fixed to the outer surface of the ceiling W and has a shape extending toward the inside (direction from the periphery of the opening toward the open portion, X-axis direction or −X-axis direction based on FIG. 3) of the opening of the ceiling W. Further, another end of the frame 120 may be coupled to the filter box 140. Further, the frame 120 is coupled to the cover plate 110 through the hinge 115, and may be coupled to the housing 130.

Referring to FIG. 4, the frame 120 may include an outer fixing part 121 fixed to the outer surface of the ceiling W, an inner fixing part 123 coupled with the filter box 140, and a connecting part 122 connecting the outer fixing part 121 and the inner fixing part 123.

According to an example embodiment, the connecting part 122 may have a shape bent to form a height difference between the outer fixing part 121 and the inner fixing part 123. For example, referring to FIG. 4, the connecting part 122 may be connected to the inner fixing part 123, by the connecting part 122 extending from the horizontal outer fixing part 121, bending vertically and extending upward and bending horizontally again. Accordingly, by locating the filter box 140 inside the ceiling surface, the frame 120 may effectively support the load of the filter box 140.

Further, referring to FIGS. 3 and 4, a lower end of the housing 130, that is, the open side may be coupled with a vertically extending portion of the connecting part 122 of the frame 120, and accordingly, a part of the frame 120 may be inserted and fitted into the housing 130.

Referring to FIG. 3, according to the example embodiment, a first piping part 150 and a second piping part 160, which are elements for use in a filter leak test, may be installed in the frame 120.

The first piping part 150 is for supplying an aerosol containing a chemical (for example, particulate form) such as a chemical used in a filter leak test, for example, PAO (poly alpha olefin), to the upper side of the filter, and the first piping part 150 is configured to communicate with the inside of the housing 130. Referring to FIG. 3, the first piping part 150 may include a first connector 151, a first pipe 152 and a nozzle 153.

The first connector 151 may be fixed to the frame 120, and enables fluid communication between the inside and the outside. For example, the first connector 151 may be coupled in a form penetrating the frame 120 from the outside to the inside. The first connector 151 is a part for connecting external equipment 1 (see FIG. 7) that supplies vaporized chemicals (for example, PAO) during a filter leak test. The first connector 151 may be connected to a connector of a pipe connected to the above described external equipment. The first connector 151 may be constituted to connect an external pipe connector in a one-touch method such as inserting, fitting and screwing.

The first connector 151 may be connected to the first pipe 152, and the nozzle 153 may be provided at an end of the first pipe 152. The chemical supplied through the first connector 151 may be supplied to the inner space S of the housing 130 through the first pipe 152, and be sprayed through the nozzle 153.

The first pipe 152 may have a form branching into a plurality of pipes. The first pipe 152 may be connected to the first connector 151 extended upward (Z-axis direction, see FIG. 3), and be bent in a horizontal direction (X-axis direction, see FIG. 3). The part extending horizontally may be located at upstream of the filter in the inner space S of the housing 130, that is, at the top of the filter box 140.

The plurality of nozzles 153 may be provided, and may be provided in the horizontally extending part located at the upper part of the filter box 140 of the first pipe 152 described above.

The second piping part 160 is for measuring the concentration of a chemical used in the filter leak test, for example, PAO (poly alpha olefin). The second piping part 160 is constituted to extend to the upstream of the filter box 140. Referring to FIG. 3, the second piping part 160 may include a second connector 161 and a second pipe 162.

The second connector 161 may be fixed to the frame 120, and fluid communication between the outside and the inside is possible through the second connector 161. For example, the second connector 161 may be coupled in a form penetrating the frame 120 from the outside to the inside.

The second connector 161 is for connecting measurement equipment for measuring the concentration of a chemical (for example, PAO) supplied through the first piping part 150 during a filter leak test. The second connector 161 may be connected to a connector of a pipe connected to the external measurement equipment described above. The second connector 161 may be constituted to connect an external pipe connector by a one-touch method such as inserting, fitting and screwing.

The second connector 161 may be disposed on a side opposite to the first connector 151 on the rectangular frame 120, but it is not limited thereto. The first connector 151 and the second connector 161 may be disposed on the same side of the rectangular frame 120 (see FIG. 5), and may be disposed on two adjacent sides of the rectangular frame 120, respectively.

The second connector 161 is connected to the second pipe 162, and an end of the second pipe 162 may be opened and may communicate with the inner space S of the housing 130. The open end of the second pipe 162 may extend to the upper side of the filter, for example, to the top of the filter box 140. Accordingly, the second piping part 160 may increase the accuracy of the PAO concentration measurement value on the upper side of the filter, and even a small amount of supplied PAO may satisfy the PAO concentration standard on the upper side of the filter.

Referring to FIG. 3, being connected to the second connector 161, the second pipe 162 may be extended in an upper direction (Z-axis direction) and then bent in a horizontal direction (X-axis direction). The part extending horizontally may extend to the upper side of the filter in the inner space S of the housing 130, that is, to the top of the filter box 140. Here, the second pipe 162 may be located lower than the first pipe 152.

Not illustrated in the drawing, but the second pipe 162 may be connected to the second connector 161 and extend upward (Z-axis direction), and the open end may be disposed at the same height as the height of the upper surface of the filter box 140 (based on the Z-axis direction). In other words, the end of the second pipe 162 and the upper surface of the filter box 140 may be disposed at the same height. Alternatively, the open end of the second pipe 162 may be adjacent to the upper surface of the filter box 140, and may be placed at a height slightly higher than the upper surface of the filter box 140.

Meanwhile, referring to FIG. 4, the housing 130 may be located inside the opening of the ceiling W, and a separating space G may be formed between the housing 130 and the perimeter of the opening. According to another example embodiment, at least a part of the first piping part 150 and the second piping part 160 may be disposed in the separating space G.

Figure 5:
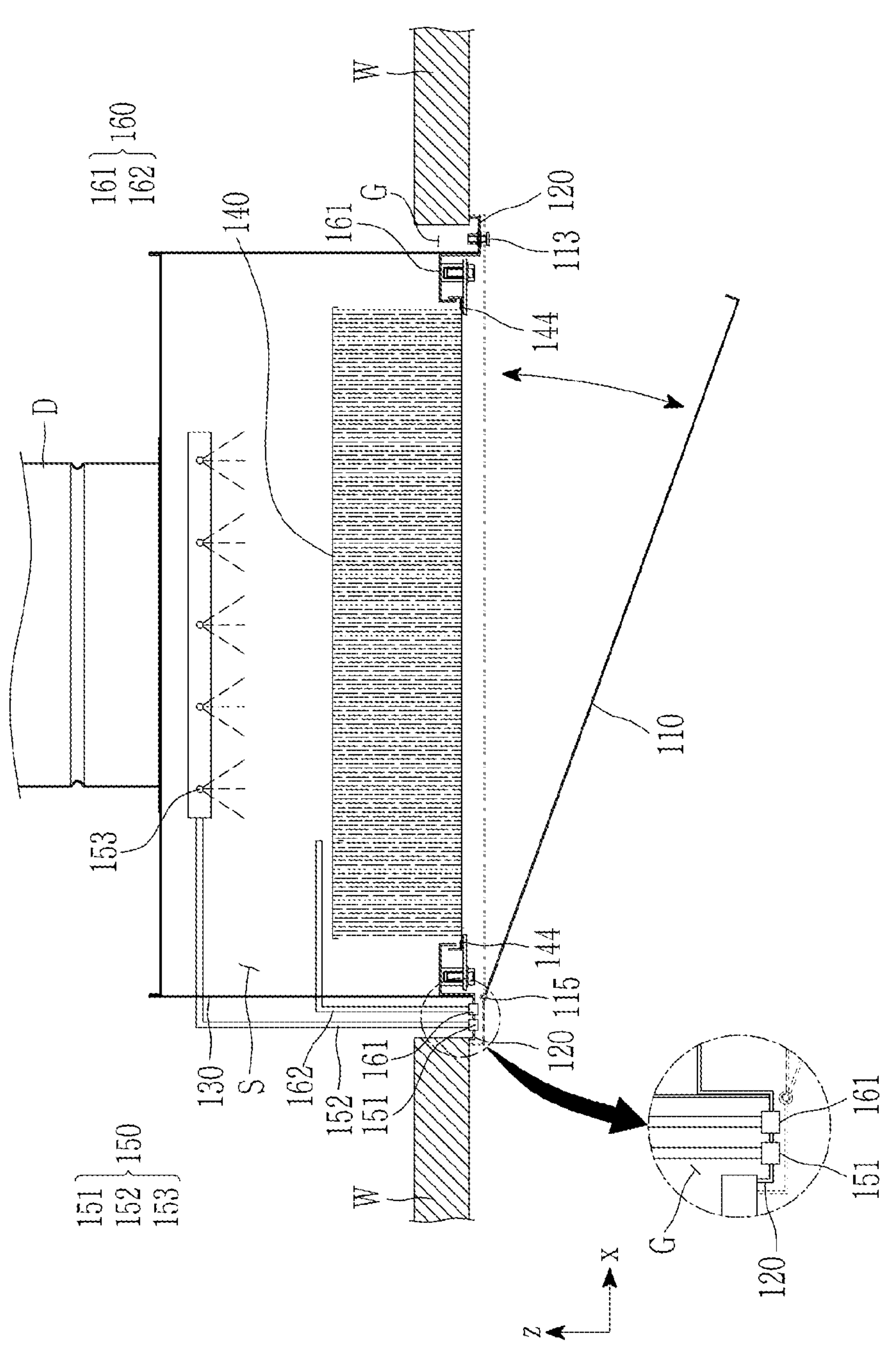
FIG. 5 is a cross-sectional view showing another example embodiment.
Figure 6:
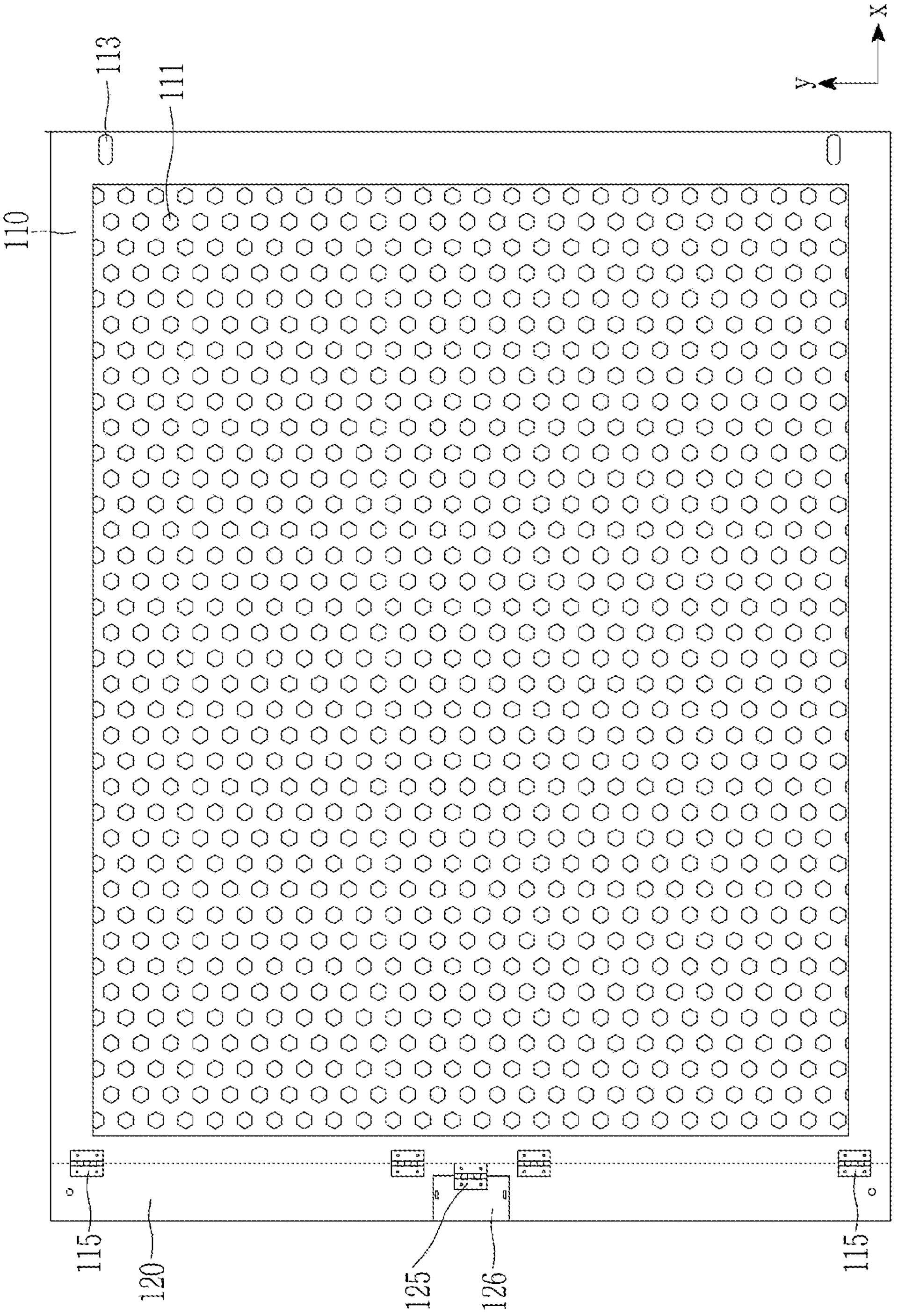
FIG. 6 is a bottom view of a filter unit according to another example embodiment.

FIG. 5 is a cross-sectional view showing another example embodiment, and FIG. 6 is a bottom view of a filter unit according to another example embodiment.

Referring to FIG. 5, the first connector 151 may be fixed to an area corresponding to the separating space G in the frame 120. Here, being connected to the first connector 151, the first pipe 152 may extend in an upward direction (Z-axis direction) along the separating space G, and be bent in the horizontal direction (X-axis direction) to penetrate the housing 130.

Further, the second connector 161 may be fixed to an area corresponding to the separating space G in the frame 120. Here, being connected to the second connector 161, the second pipe 162 may extend in an upward direction (Z-axis direction) along the separating space G, and may be bent in a horizontal direction (X-axis direction) to pass through the housing 130.

As such, by at least a part of the first piping part 150 and the second piping part 160 being disposed outside the housing 130, that is, in the separating space between the perimeter of the ceiling opening and the housing 130, the part of the first piping part 150 and the second piping part 160 may be located far from the filter box 140, and thus during the filter leak test, the influence of the first piping part 150 and the second piping part 160 may be minimized and interference between equipment used for filter leak test can be prevented.

Further, FIG. 5 illustrates a state in which the first connector 151 and the second connector 161 are installed adjacent to each other, that is, a state in which the first connector 151 and the second connector 161 are installed on the same side of the rectangular frame 120, but it is not limited thereto. The first connector 151 and the second connector 161 may be disposed on opposite sides of the rectangular frame 120, respectively, or the first connector 151 and the second connector 161 may be disposed on two adjacent sides of the rectangular frame 120, respectively.

Further, referring to FIG. 6, the first connector 151 and the second connector 161 may be covered by a covering member 126. Accordingly, when the filter leak test is not performed, the first connector 151 and the second connector 161 may be covered with the covering member 126 so as not to be exposed to the outside, and thus the first connector 151 and the second connector 161 may be protected.

Here, being connected to the frame 120 through a connecting part 125, the covering member 126 may be constituted to be opened and closed. For example, the connecting part 125 may include a structure that is connected to enable opening and closing, such as a hinge.

Hereinafter, a method for a filter leak test using the filter unit 100 will be described according to an example embodiment.

Figure 7:
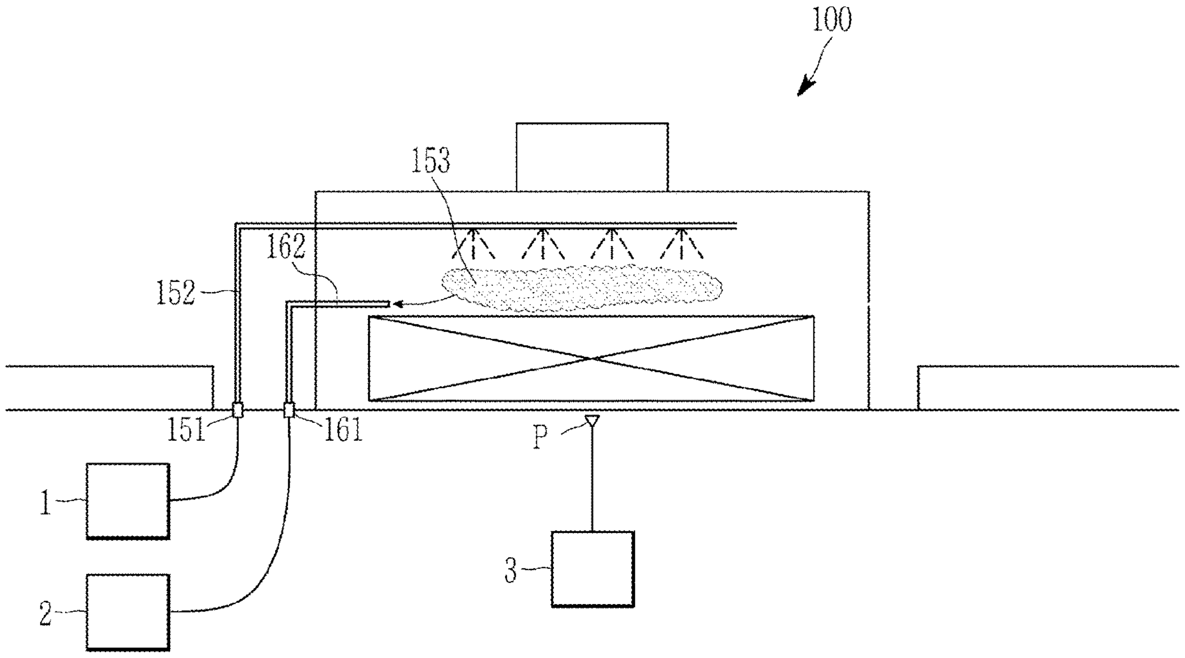
FIG. 7 is a schematic diagram showing a leak test process for a filter unit according to an example embodiment.

FIG. 7 is a schematic diagram showing a leak test process for a filter unit according to an example embodiment. Meanwhile, FIG. 7 illustrates that the first connector 151 and the second connector 161 are installed outside the housing 130, but it is an example embodiment. As described above, even if the first connector 151 and the second connector 161 are installed inside the housing 130, the following description applies equally.

Referring to FIG. 7, the supply equipment 1 for supplying vaporized chemicals (for example, PAO) may be connected to the first connector 151 provided in the filter unit 100 through a pipe. Accordingly, vaporized chemicals may be sprayed through the nozzle 153 of the first piping part 150. Here, the sprayed chemicals are mixed with the air supplied through the duct and pass through the filter box 140.

Further, in order to test filter performance (leakage), the chemical concentration on the upstream of the filter and the chemical concentration on the downstream of the filter may be measured. Filter performance and leakage may be identified by comparing the measured chemical concentration on the upstream of the filter with the chemical concentration on the downstream of the filter. The filter unit 100 according to an example embodiment of the present disclosure may efficiently perform the filter leak test. Hereinafter, a filter leak test process will be schematically described with reference to FIG. 7.

First, in order to measure the chemical concentration of the upper side of the filter, equipment 2 for measuring upper side concentration for measuring upper side concentration may be connected to the second connector 161 provided in the filter unit 100. Here, the second connector 161 may be connected to the second pipe 162 and an end of the second pipe 162 may be open and disposed adjacent to the upper surface of the filter box 140. Accordingly, the concentration of the chemical immediately before the chemical sprayed from the nozzle 153 passes through the filter can be measured.

Next, in order to measure the chemical concentration on the downstream of the filter, a measuring probe P connected to equipment 3 for measuring the downstream concentration may be disposed adjacent to the lower surface of the filter box 140. Here, the filter performance or leakage may be identified by comparing the concentration measured through the measuring probe P and the concentration measured through the second pipe 162.

As described above, since the cover plate 110 is hinged to the filter unit 100 according to an example embodiment of the present disclosure, replacement and maintenance of the filter box 140 can be performed safely and easily without removing the cover plate.

Further, the first connector 151 and the second connector 161 for connecting equipment used in the filter leak test are integrally installed in the frame 120 and are provided in the filter unit 100 itself, and thus the effort and time required for the filter leak test can be reduced.

MODE FOR CARRYING OUT THE INVENTION

The example embodiments are described for the present disclosure, but the present disclosure is not limited thereto. There may be various modified example embodiments within the scope of the claims, the detailed description and the accompanying drawings of the present disclosure.

INDUSTRIAL APPLICABILITY

The example embodiments may be applied to a filter unit installed in an opening in a wall such as a ceiling, or some or all of the example embodiments may be applied to a filter unit used in other areas.

The invention claimed is:

1. A filter unit, comprising:

a frame fixed along a perimeter of an opening in a wall;

a housing connected to the frame to form an inner space;

a cover plate installed on the frame to cover the inner space; and a filter box provided with a filter and installed in the inner space, wherein the frame has a first piping part communicating with an inside of the housing and a second piping part extending to an upper end of the filter box.

2. The filter unit of claim 1, wherein the cover plate is coupled to the frame by a hinge to open and close the inner space.

3. The filter unit of claim 2, wherein the cover plate is coupled to one side of the frame by the hinge, and is coupled to another side of the frame by a fastening member.

4. The filter unit of claim 1, wherein the cover plate has a plurality of holes for fluid communication.

5. The filter unit of claim 1, wherein the frame has an end that is fixed to an outer surface of the wall and extends inwardly of the opening and another end that is coupled to the filter box.

6. The filter unit of claim 5, wherein the frame includes:

an outer fixing part that is fixed to the outer surface of the wall;

an inner fixing part that is coupled with the filter box; and a connecting part that connects the outer fixing part and the inner fixing part, and is bent to form a height difference between the outer fixing part and the inner fixing part.

7. The filter unit of claim 1, wherein the first piping part includes:

a first connector communicating with an outside and fixed to the frame;

a first pipe connected to the first connector and extending to the inner space; and a nozzle provided to the first pipe.

8. The filter unit of claim 1, wherein the second piping part includes:

a second connector communicating with an outside and fixed to the frame; and a second pipe connected to the second connector, extending to the upper end of the filter box and having an open end.

9. The filter unit of claim 1, wherein the housing is located inside the opening, and wherein a separating space is formed between the housing and the perimeter of the opening.

10. The filter unit of claim 9, wherein the first piping part includes:

a first connector communicating with an outside and fixed to a portion of the frame, the portion corresponding to the separating space;

a first pipe that is connected to the first connector, penetrating the housing in the separating space, and extending to the inner space; and a nozzle provided at a position of the first pipe, the position corresponding to the inner space.

11. The filter unit of claim 9, wherein the second piping part includes:

a second connector communicating with an outside and fixed to a portion of the frame, the portion corresponding to the separating space; and a second pipe connected to the second connector, penetrating the housing in the separating space, and extending to the upper end of the filter box, and wherein an end of the second pipe at the upper end of the filter box is open.

12. The filter unit of claim 11, wherein the open end of the second pipe has a height that is equal to or higher than a height of the upper end of the filter box.

* * * * *